UNITED STATES PATENT OFFICE.

JOHN LEIGH, OF MANCHESTER, ENGLAND.

IMPROVEMENT IN SIZING COMPOSITIONS FOR YARN, PAPER, &c.

Specification forming part of Letters Patent No. 17,381, dated May 26, 1857.

*To all whom it may concern:*

Be it known that I, JOHN LEIGH, of the city of Manchester, in the county of Lancaster and Kingdom of England, surgeon, being a subject of Victoria, Queen of the said Kingdom, have invented or discovered the use or application of a certain substance or substances in the sizing, stiffening, or otherwise preparing cotton, linen, or other yarns and woven fabrics, and in the manufacture of paper; and I hereby declare that the following is a full and exact description of my said invention or discovery.

My said invention consists of the application of silicate of soda or silicate of potash to the sizing, dressing, stiffening, or otherwise preparing yarns and woven fabrics, and in the manufacture of paper as a sizing substance, instead of flour, starch, or other substances hitherto used for those purposes, which silicates I use either alone or in combination with sulphate of barytes, flour, starch, or other similar substances. The said silicates may be prepared by fusing together in a suitable furnace fine pure white silicious sand, quartz, or similar matter with caustic soda or carbonate of soda, caustic potash or carbonate of potash, in proportions varying with the solubility or alkalinity of the silicates intended to be obtained. A little charcoal may be mixed with the sand or quartz and the said carbonates, if desirable; but care must be taken that no lime or alumina be present in undue quantity, as it would render the resulting glass less soluble.

The proportions for making the silicate of potash may be about equal weights of clean sand or quartz and dry carbonate of potash, and for the silicate of soda about equal weights of clean sand and soda-ash, containing about fifty per cent. of real alkali; but these proportions may be varied according to circumstances, or to answer the purpose for which the respective silicates are intended; but as they are articles of commerce it is unnecessary for me to describe their mode of manufacture more particularly.

For the application of the silicates to the before-mentioned purpose or purposes I dissolve them by steam or hot water in suitable vessels made of copper or clean iron, or other suitable material. To the solution thus obtained I add so much of a solution of hypochlorite of lime or soda (commonly called "bleaching-liquor") as may destroy any brown tint and render colorless the dissolved silicates. The liquor must be briskly agitated or stirred during the whole time of the addition. I then cautiously and slowly pour in so much of a diluted acid (and I prefer to use the sulphuric acid of commerce diluted with about eight parts of water) as shall take up any free alkali that may exist in the silicate of soda or potash. I add the diluted acid with brisk agitation until flocks or flakes of silica begin to separate from the solution and float in the mixture; but if the quantity of free alkali be inconsiderable it may not be necessary to introduce the acid, although I prefer to do so. I pour the solution of silicate of soda or potash thus prepared into clean boilers made of copper or iron, and boil it down to the strength required, which will vary with the weight or quality of the cloth to be manufactured, and when cool I pour it into clean glass carboys, ready for use.

For sizing with this solution it must be reduced to the requisite consistency by the addition of clean water or steam to the gravity required; but it will be clearly evident that the said consistency must vary according to the kind of cloth for which the yarn is intended, or the particular purpose for which it is to be employed. The said reduction of the solution may be effected in the sizing-trough or sizing-vessel, which ought to be made of copper, clean iron, or other suitable material. A quantity of tallow or other grease, or soap, may be introduced at the same time into the trough or sizing-vessel, as is often done in sizing with flour-paste.

In using the said silicates in the manufacture of paper it may either be mixed with the pulp in the preparatory process or used as size after the paper is made to give it additional body or strength.

I claim as my invention or discovery—

The sizing and dressing of yarns, woven goods, and paper by means of the alkaline silicates as set forth in the specification.

JOHN LEIGH.

In presence of—
E. J. HUGHES,
 *Patent Agent, Manchester.*
F. ITDERTON,
 *Assistant Surgeon, Manchester.*